Jan. 3, 1956 C. L. GILBERT 2,729,128
CHUCK-STOCK FOR DRILL PRESSES AND THE LIKE
Filed Nov. 5, 1952 4 Sheets-Sheet 1
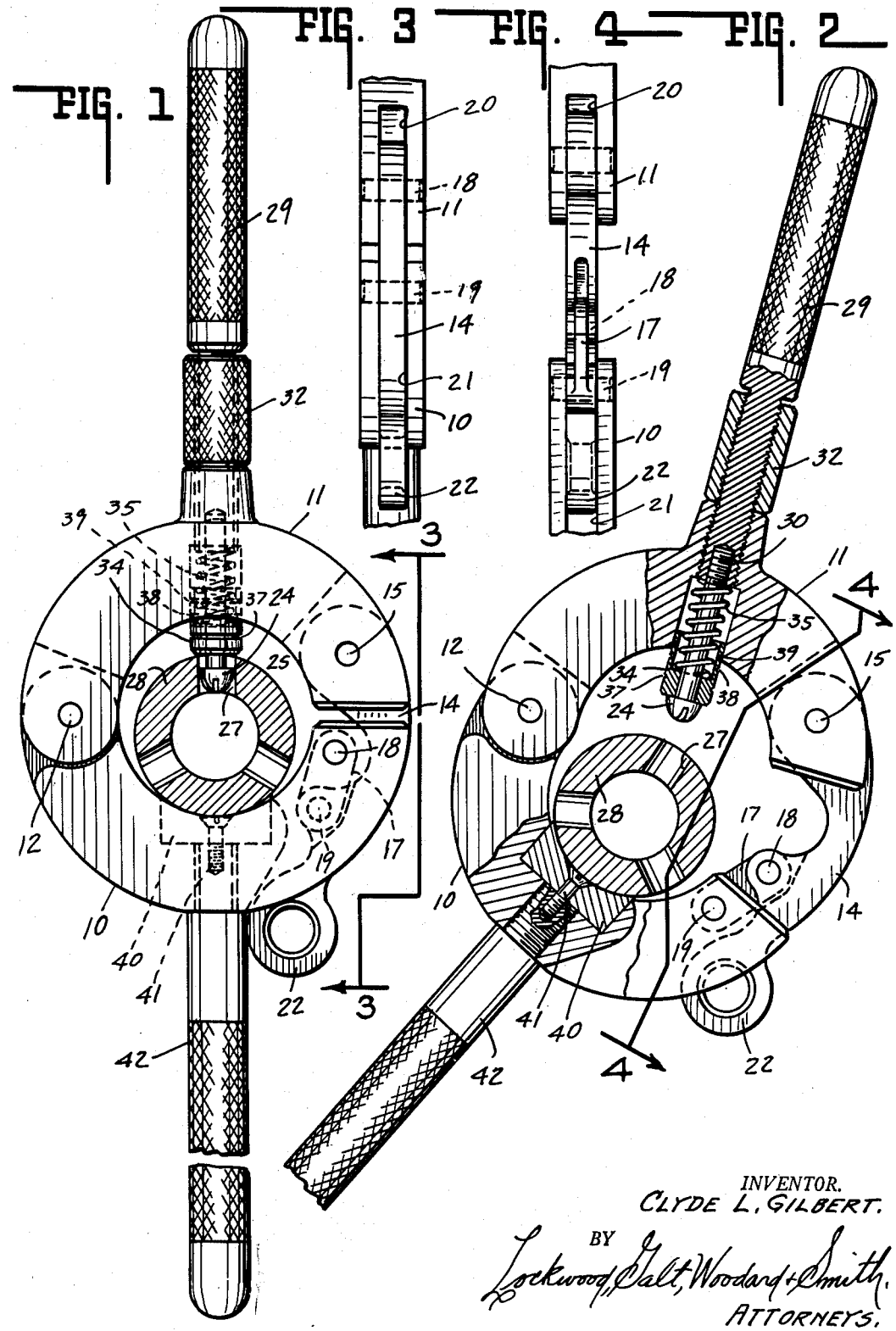
INVENTOR.
CLYDE L. GILBERT.

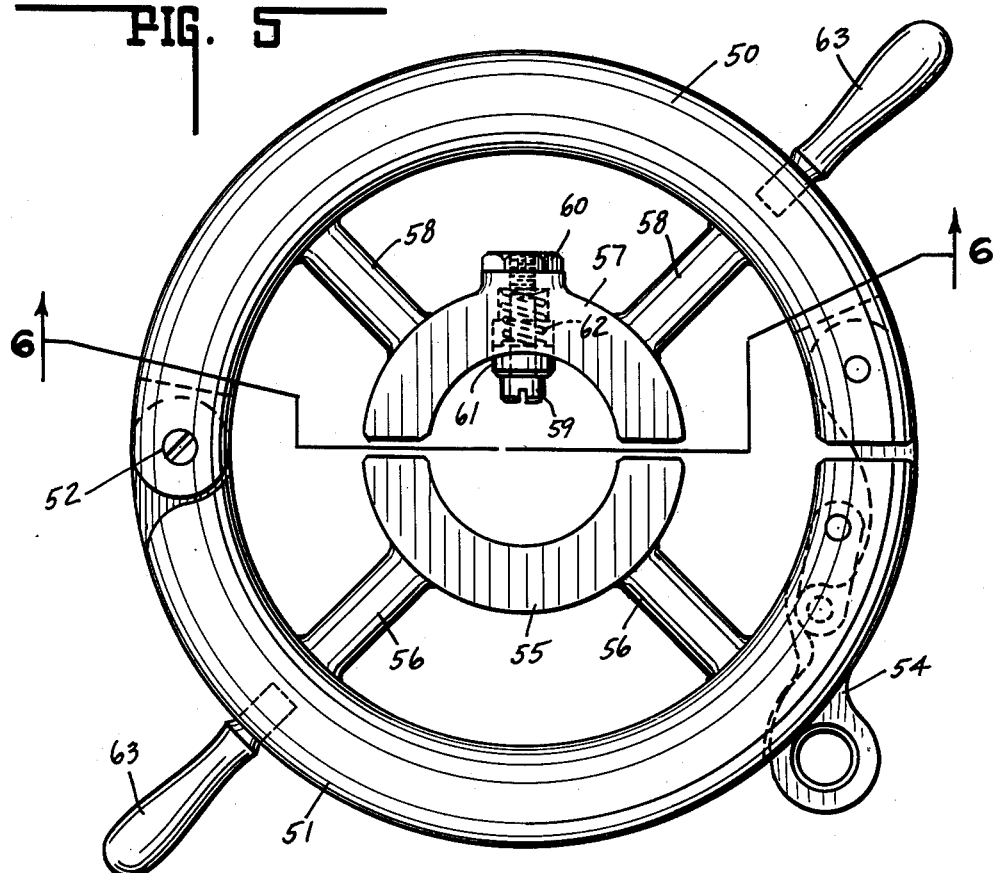
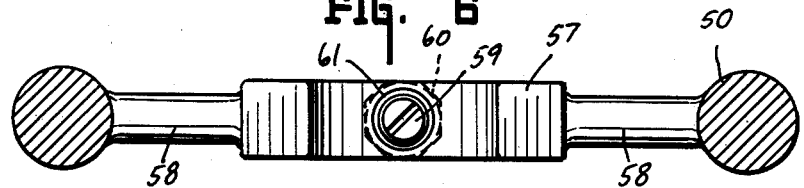
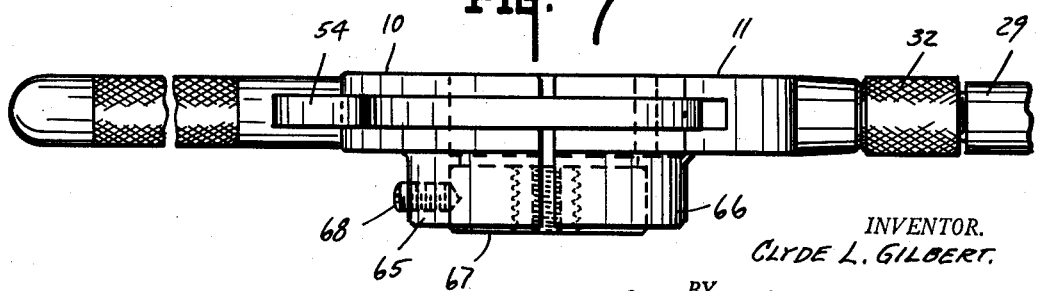

Jan. 3, 1956
C. L. GILBERT
2,729,128
CHUCK-STOCK FOR DRILL PRESSES AND THE LIKE
Filed Nov. 5, 1952
4 Sheets-Sheet 3
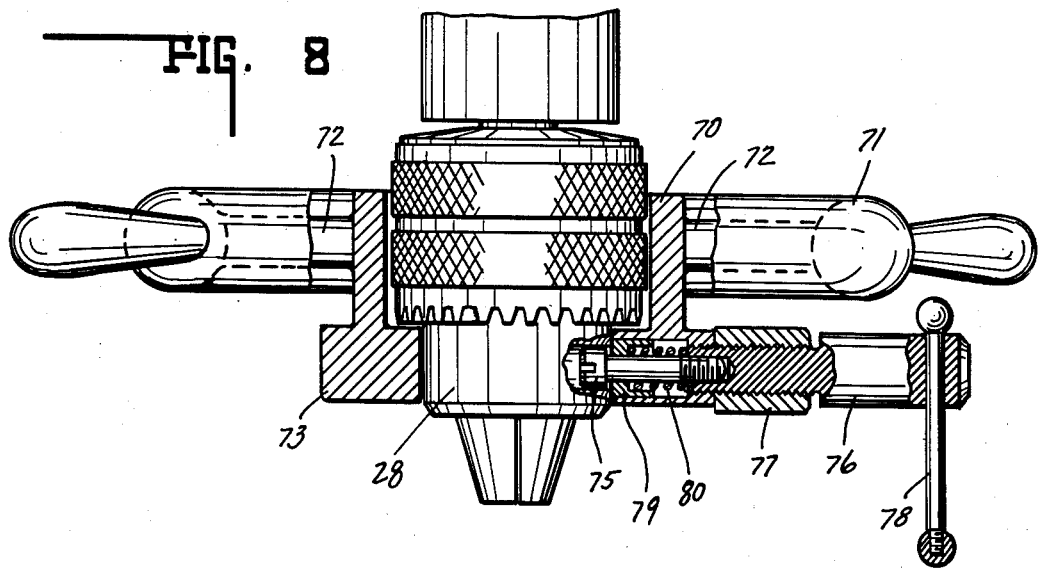
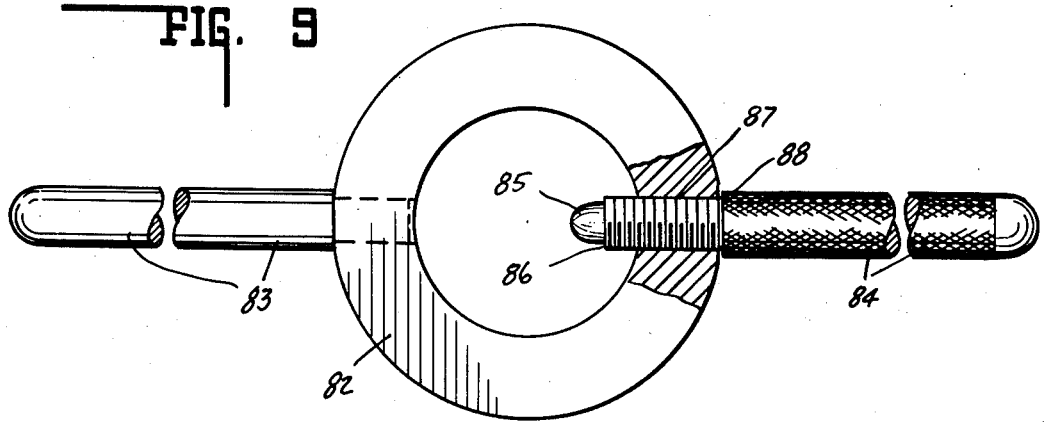
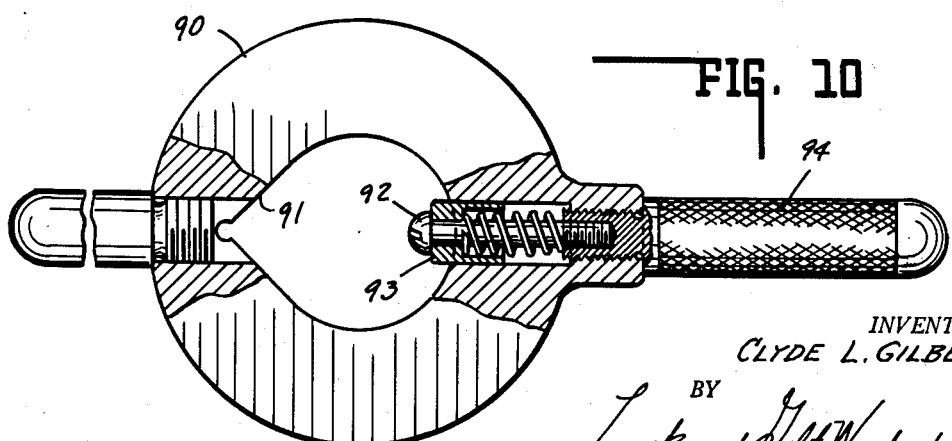
INVENTOR.
CLYDE L. GILBERT.
BY
Lockwood, Galt, Woodard & Smith
ATTORNEYS.

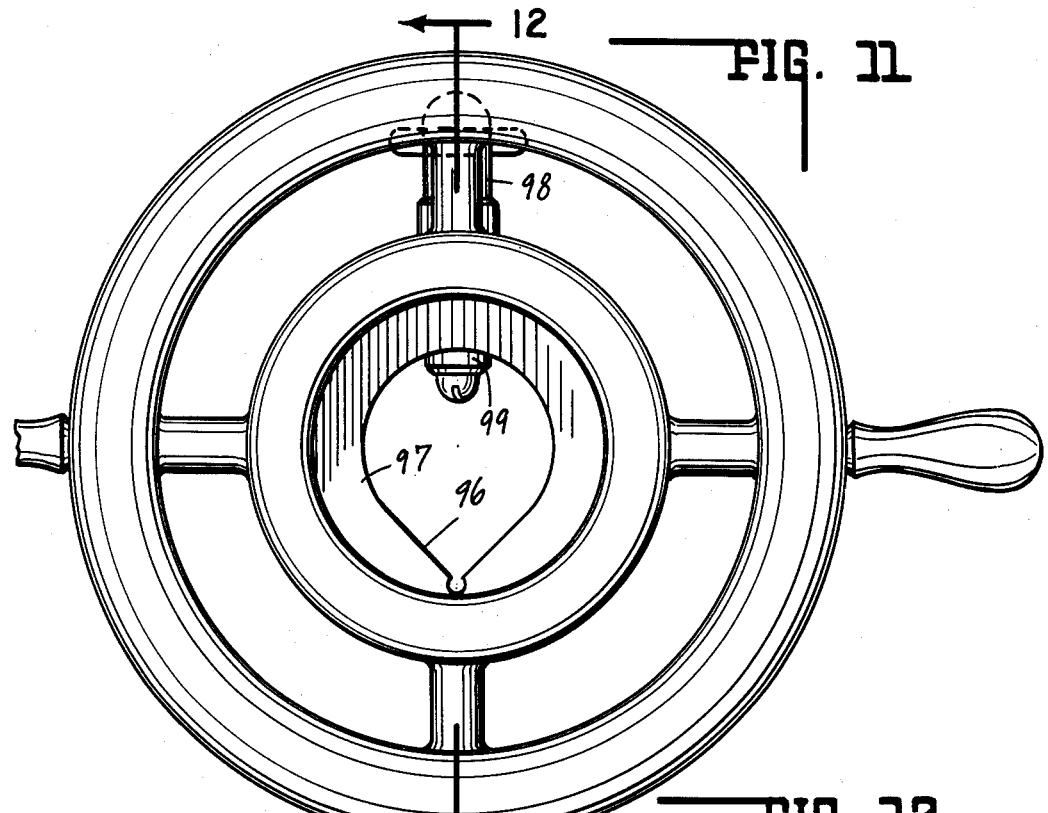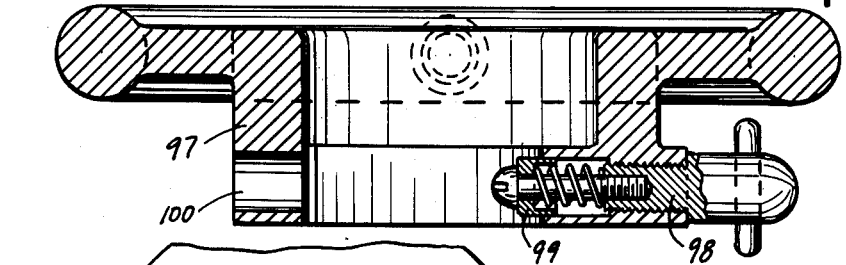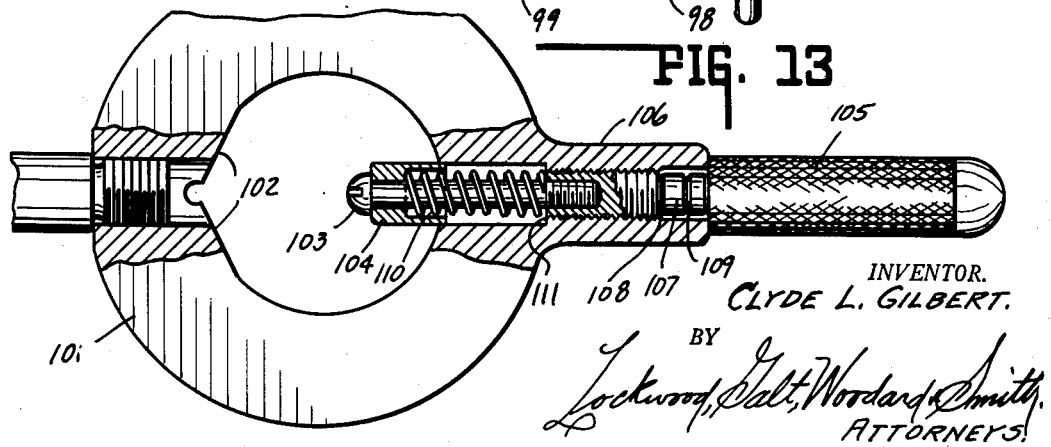

United States Patent Office 2,729,128
Patented Jan. 3, 1956

2,729,128

CHUCK-STOCK FOR DRILL PRESSES AND THE LIKE

Clyde L. Gilbert, Elkhart, Ind

Application November 5, 1952, Serial No. 318,838

14 Claims. (Cl. 81—90)

This invention relates generally to accessory tools for carrying out threading and reaming processes, and more particularly to a chuck stock adapted to cooperate with a chuck, a reamer, a chasing die or a tap for cutting external or internal threads on a drill press, milling machine, lathes or similar metal or woodworking machines.

In accordance with conventional shop practice the process of cutting threads on relatively small work pieces consists of manually applying the tap or a die to a work piece. The tap or die must be aligned axially with the work piece by eye, an extremely difficult and highly skillful operation, and misalignment of the tap or die may cause spoilage of the work piece or damage to the tap or die. Reamers are also applied manually to relatively small work pieces whereby axial alignment is essential to prevent spoilage of the work piece or damage to the reamer which frequently occurs.

The principal object of this invention is to provide an accessory tool adapted to cooperate with a drill press, milling machine, lathe or the like for manually rotating a tap, die or reamer.

Another object of this invention is to provide an accessory tool for a drill press, milling machine, lathe or the like, which is adapted to cooperate with chucks of different sizes for controlling the operation of a tap, die or reamer.

Still another object of this invention is to provide an accessory tool of the character described having a simple and positive locking mechanism for adjustably affixing the tool to chucks of different sizes.

In accordance with this invention there is provided an accessory tool for drill presses, lathes, milling machines or the like and adapted to embrace and operatively engage a chuck, said tool comprising a collar member, a stud mounted for engagement with the key pilot hole of the chuck and handle means affixed to the collar for manual operation to impart rotational movement to the chuck.

In accordance with another feature of this invention there is provided an accessory tool for drill presses, lathes, milling machines or the like adapted to embrace and operatively engage a chuck comprising a split collar adapted to receive chucks of different diameters, and an adjustable stud mounted in the collar for engaging a key pilot hole of the chuck, said stud including a spring biased collar adapted to forcibly engage the chuck and the collar for holding the tool in fixed relation with respect to the chuck.

The full nature of the invention will be understood from the accompanying drawings and the following description and claims:

Fig. 1 is a top plan view of the chuck stock provided in accordance with this invention.

Fig. 2 is a top plan view with the tool in its open position and having parts broken away and partially in section.

Fig. 3 is a partial side view taken on line 3—3 of Fig. 1

Fig. 4 is a partial cross sectional view taken on line 4—4 of Fig. 2.

Fig. 5 is a top plan view of a modification of this invention.

Fig. 6 is a cross sectional view taken on line 6—6 of Fig. 5.

Fig. 7 is a side elevation of another modification of this invention.

Fig. 8 is a side elevation of still another modification of this invention.

Fig. 9 is a top plan view of a further modification of this invention.

Fig. 10 is a top plan view with parts broken away of another modification of this invention.

Fig. 11 is a top plan view of a modification of the invention shown in Fig. 8.

Fig. 12 is a cross section taken on line 12—12 of Fig. 11.

Fig. 13 is a top plan view with parts broken away of still another modification of this invention.

In accordance with this invention there is provided a chuck stock comprising a split collar having semicircular members 10 and 11 hinged together at one side thereof by means of a hinge pin 12 and expansively hinged at the other side thereof by means of a toggle linkage comprising a toggle lever 14 pinned to member 11 by means of pin 15 and hinged to member 10 by means of lever 17. Lever 14 may be pivotally attached to lever 17 by means of a pin 18, and lever 17 may in turn be pivotally connected to collar member 10 by means of pin 19. As shown in the drawings, levers 14 and 17 are nested respectively within slot 20 of collar member 11 and slot 21 of collar member 10. Lever 14 includes a handle portion 22 whereby the lever may be operated manually for opening or closing collars 10 and 11. In order to obtain a toggle locking action, it will be noted that the center line of pin 18 is disposed slightly to the right of a line connecting the centers of pins 15 and 19 when the collars are in their closed positions.

For locking the chuck stock to a chuck there is provided a stub member 24 which projects within the opening 25 between collar members 10 and 11, thereby to be engageable with a key pilot hole 27 of a chuck 28. For adjustably mounting stud 24 a handle 29 is threaded within collar member 11, and the stud 24 may be threaded into the base portion of the handle 29 as at 30. For locking the stud 24 and handle 29 in a preadjusted position, there is provided a locking collar or nut 32 threaded on the threaded portion of handle 29.

For forcibly engaging collar member 10 with chuck 28 there is provided an outwardly protruding shoulder in the form of a collar member 34 which slideably fits over stud 24 and is urged outwardly of collar member 11 by means of a spring 35. Thus, when collar members 10 and 11 are closed about the chuck 28, the stud 24 may enter a key hole 27 while the collar member 34 engages the periphery of the key pilot hole 27, moving backwardly against the action of spring 35, thereby to exert pressure on chuck 28.

Collar 34 may be provided with a series of marked rings such as rings 37, 38 and 39, ring 37 indicating the pre-set portion of stud 24 for engaging a relatively large sized chuck. Ring 38 may indicate the setting for a medium sized chuck while ring 39 indicates the setting for a small chuck. The three indicated adjustments are provided so that the chuck stop may be applied to the three standard sizes of chucks customarily provided for drill presses and lathes.

For preventing any chattering action between collars 10 and 11 and chuck 28, there is provided a steel insert 40 nested within collar 10 and having a curvature of a radius equal to the radius of the smallest sized chuck. Member 40 may be fixed within collar member 10 by means of a screw 41 which threadedly engages a second handle 42. Since insert member 40 has a curvature corresponding to that of the smallest sized chuck, it will always positively engage chucks of larger sizes and hold them in a nonchattering position, particularly because of the pressure action of collar 34 and its cooperating spring 35.

In operation for cutting threads with a tap or for reaming a tap or reamer may be mounted within chuck 28, and the chuck stock may be adjusted for the particular size of chuck by rotating handle 29 until the marker ring 39, for example, is in alignment with the interior periphery of collar 11. This indicates that the stud 24 will engage within the key pilot hole 27 of a small sized chuck. With the chuck stock in the open position illustrated in Fig. 2, the handles 29 and 42 may be drawn into alignment with one another, moving the linkage 14—17 into its locking position as illustrated in Fig. 1. Simultaneously stud 24 will enter a key pilot hole 27 with the collar 34 abutting the outer periphery of chuck 28. Spring 35 may be designed to exert a pressure of approximately 85 pounds on collar 34, whereby as the collars 10 and 11 close with respect to one another, collar 34 exerts sufficient pressure to engage the insert 40 with chuck 28 to prevent any tendency of the collar and the chuck to chatter with respect to one another. The toggle linkage 14, 17 being an over-center device, has a locking action which holds the collars 10 and 11 in closed position. With the chuck stock in its operative position a tap or reamer may be rotated into engagement with a bore for threading or reaming thereof. It will be obvious that since the tap or reamer is being operated in a drill press, it will be in vertical alignment with respect to the bore of the work piece, and a highly accurate threading or reaming operation may be carried out.

Referring to Fig. 5 of the drawings, there is provided a modification of this invention consisting of a split ring having members 50 and 51 hinged to one another by means of a hinge pin 52. In order to expansively link members 50 and 51 there is provided a toggle linkage 54 similar in all respects to that shown in Figs. 1 to 4 and connecting the ends of rings 50 and 51. Within the rings 50 and 51 there is provided a half collar 55 connected to ring 51 by means of spokes 56. The second half collar 57 may be supported on ring member 50 by means of spokes 58, the collar members 55 and 57 being adapted to embrace a chuck such as 28 illustrated in Figs. 1 and 2. For preventing relative rotation between collars 55 and 57 and the chuck 28, there is provided a stud 59 threaded into collar 57 and having a locknut 60 for locking stud 59 in its operative position for engaging the key pilot hole of chuck 28. For exerting pressure on chuck 28 there is provided an outwardly protruding shoulder in the form of a collar 61 and spring 62 which cooperate to positively engage chuck 28 and prevent any chattering action. Handles 63 may be provided in the ring members 50 and 51 for handling and operating the chuck stock.

This modification of the invention is adapted to cooperate with a chuck of a given size and is not adjustable. Its operation is identical with that of the chuck stock illustrated in Figs. 1 to 4 except for the adjustment features of the latter.

Fig. 7 illustrates another modification of this invention which is particularly adapted to cut threads in cooperation with a chuck by means of a die. This modification of the invention is similar to that shown in Figs. 1 to 4 except that the collars 10 and 11 are provided with downwardly extending clamp members 65 and 66 adapted to embrace and clamp a die 67. A set screw 68 may be provided for engaging and locking a die within clamp members 65 and 66. In operation this modification of the invention may be clamped to a chuck in the same manner as described in connection with Figs. 1 to 4, after which the die 67 may be inserted and locked within members 65 and 66 by means of said screw 68. It should be noted that the clamping members 65 and 66 extend downwardly a distance sufficient to afford reasonable clearance between the die 67 and the lower end of the conventional chuck, whereby there will be no interference as between the chuck and the die.

Fig. 8 illustrates still another modification of this invention wherein a unitary annular collar member 70 is substituted for the split collar 55—57 of Fig. 5, the collar 70 being supported within a ring 71 by means of a plurality of spokes 72. On the lower side of collar 70 there is provided a unitary secondary collar 73 which embraces the lower portion of the chuck having the key pilot holes. Within collar 70 there is provided an adjustable stud 75 for engaging within the key pilot holes of the chuck, stud 75 being threadedly mounted in an adjusting bolt 76 which in turn is threaded into collar 73. Bolt 76 may be provided with a locknut 77 and an operating handle 78. As in the other modifications of this invention, stud 75 is provided with an outwardly protruding shoulder in the form of a pressure collar 79 which may be biased into pressure engagement with the chuck by means of a spring 80.

In operation the chuck stock illustrated in Fig. 8 may be mounted on the chuck by first unscrewing bolt 76 until stud 75 nests within collar 73. The chuck stock may then be moved into position over the chuck with stud 75 in alignment with one of the key pilot holes, after which bolt 76 may be screwed inwardly until stud 75 is well within the key pilot hole, at which time collar 79 will have compressed spring 80, thereby to provide a non-chattering connection between the chuck stock and the chuck.

Fig. 9 illustrates another modification of this invention wherein there is provided a unitary collar 82 having handles 83 and 84. Collar 82 may be dimensioned to receive chucks of different sizes or only a single size of chuck. Handle 84 includes as an integral part thereof a chuck engaging stud 85 having a shoulder 86 for engaging the chuck adjacent to the key pilot hole. Handle 84 is threaded into collar 82 as at 87 for adjustment of stud 85 and shoulder 86 into engagement with chucks of different sizes, or into engagement with a single size of chuck. This particular modification is adapted to cooperate with chucks of different sizes and handle 84 may be unscrewed until stud 85 nests within collar 82 or is out of the way of the chuck. The chuck stock may then be mounted on the chuck and handle 84 screwed inwardly to engage stud 85 with a key pilot hole of the chuck and shoulder 86 with the periphery of the hole, thereby to prevent chattering and the pressure on threads 87 serving to hold the handle 84 and stud 85 in their finally adjusted positions.

Fig. 10 illustrates another modification of this invention wherein there is provided a unitary collar 90 having an inner notched portion 91 which performs a function similar to that of the insert member 40 illustrated in Figs. 1 and 2. The notch provides two points of engagement with a chuck while a round headed stud 92 and its associated shoulder member in the form of a spring biased collar 93 provide a third point of engagement with the chuck. The three points of engagement insure the elimination of any chatter between collar 90 and the chuck. The stud 92 is threaded in a handle 94, but no lock nut is provided for locking the handle with respect to the collar, thereby to illustrate that the handle may be tightened sufficiently to maintain its adjusted position.

This modification of the invention also differs from those previously described in that the head of stud 92 is illustrated as rounded, this shape permitting the stud to lead itself into the pilot key hole of the chuck even though the stud may initially be slightly misaligned with respect to the pilot key hole.

Figs. 11 and 12 illustrate a modification of the invention shown in Fig. 8 wherein a notch 96 is provided within the unitary secondary collar 97 which corresponds generally with the secondary collar 73 of Fig. 8. Notch 96 serves the same function as notch 91 illustrated in Fig. 10 by providing two finite points of contact with a chuck, thereby to eliminate any chatter between the chuck and the collar. As shown in Fig. 12 this modification of the invention also differs from that illustrated in Fig. 8 in that no lock nut is provided on the bolt 98 which corresponds generally with bolt 76 of Fig. 8. Thus it is shown that while a lock nut may be desirable, the invention is still operative without such a lock nut. In order to permit the formation of a counterbore for receiving the shoulder member or collar 99, there is provided in collar 97 a hole 100 through which a drill may be extended.

Fig. 13 of the drawings illustrates a modification of the invention illustrated in Fig. 10 wherein the collar 101 is dimensioned to receive chucks of at least three different sizes. The inner periphery of collar 101 is provided with a notched portion 102 adapted to engage a chuck at two finite points and in cooperation with stud 103 and shoulder member or spring biased collar 104 to engage the chuck at three finite points for preventing chatter between the chuck and collar 101. For adjusting the stud 103 into engagement with the pilot key holes of chucks of different sizes handle 105 is threadedly mounted in an integral extension 106 of collar 101. The portion 107 of handle 105 may be grooved at 108 and 109, thereby to provide an indication of the position of stud 103 and collar 104 within collar 101. For example, when groove 108 is in alignment with the outer end of extension 106, stud 103 and collar 104 will be in the proper position to engage the pilot key hole of a large size chuck. When groove 109 is in alignment with the outer end of extension 106, stud 103 and collar 104 will be positioned for engagement with the key pilot hole of a medium sized chuck. Handle 105 and stud 103 together with its spring biased collar 104 are illustrated in Fig. 13 in the adjusted position for engagement with a small chuck. While no lock nut is shown in the modifications illustrated in some of the figures and including Fig. 13, it will be understood that the pressure of the collar baising spring such as spring 110 in Fig. 13 will serve to bind the threaded portion of the handle with respect to the threads cut in the collar, thereby serving to lock the handle in its adjusted position. A further feature of this invention includes the shoulder such as shoulder 111 shown in Fig. 13 and also in Figs. 2, 8, 9, 10 and 12, which serves to prevent the handle 105 from being unscrewed from the collar out of complete engagement with the threads therein, the collar 104 engaging shoulder 111 when the outer end of stud 103 recedes within collar 101. Thus handle 105 may be unscrewed to the limit of its outer movement automatically to position the head of stud 103 within collar 101 for receiving the chuck.

With reference to Fig. 10 of the drawings, it is within the scope of this invention to substitute for stud 92 and collar 93 a stud having as an integral part thereof a shoulder of the same relative dimensions as collar 93 whereby the spring member may be eliminated, if it is desired, to reduce the cost of manufacture.

From the foregoing description of this invention it will be apparent that there is provided a chuck stock for operating taps, dies or reamers in cooperation with drill presses, lathes or milling machines whereby highly accurate threading and reaming operations may be performed with substantial saving of alignment and working time. Each modification of the invention includes apparatus for insuring a non-chattering engagement between the chuck stock and the chuck. The adjustable modification of the invention is provided with a positive toggle action linkage which may be locked and unlocked by means of simple manipulations of the chuck stock or of the handle 22.

It will be obvious to those skilled in the art that the various parts of the chuck stock provided in accordance with this invention may be carefully machined to provide highly precise interfitting parts, or the various parts of the device may be initially cast and then machined. Some parts such as the rings and collars may be die castings having the insert 40 cast integrally therewith, or the insert 40 may be a separate steel part mounted as illustrated in Figs. 1 and 2.

The invention claimed is:

1. An accessory tool for drill presses, lathes, milling machines and the like adapted to embrace and operatively engage a chuck, comprising a split collar hinged at one side thereof and including an expansive linkage connecting the opposite side thereof, said linkage comprising a pair of toggle levers pivotally connected to one another and to said opposite sides for locking said collar in closed position and opening said collar for removal of said tool from a chuck, a handle mounted on each portion of said collar, a stud threadedly mounted in one of said handles for engaging the key pilot hole of said chuck, said one handle being threaded in one portion of said collar for adjusting said stud to engage chucks of different sizes, and a spring biased collar slidably mounted on said stud for engaging said chuck and forcing it into positive engagement with the other side of said collar.

2. An accessory tool for drill presses, lathes, milling machines and the like adapted to embrace and operatively engage a chuck, comprising a split collar hinged at one side thereof and including an expansive linkage connecting the opposite side thereof, said linkage comprising a pair of toggle levers pivotally connected to one another and to said opposite sides for locking said collar in closed position and opening said collar for removal of said tool from a chuck, a handle mounted on said collar, and a stud including a shoulder as an operative part thereof mounted in one of said handles for engaging the key pilot hole of said chuck, said one handle being threaded in one portion of said collar for adjusting said stud to engage chucks of different sizes.

3. An accessory tool for drill presses, lathes, milling machines and the like adapted to embrace and operatively engage a chuck, comprising a split collar hinged at one side thereof and including an expansive linkage connecting the opposite side thereof for locking said collar in closed position and opening said collar for removal of said tool from a chuck, a handle mounted on said collar, a stud mounted in said handle for engaging the key pilot hole of said chuck, said handle being adjustably mounted in said collar for adjusting said stud to engage chucks of different sizes, and a collar mounted on said stud for engaging said chuck and forcing it into positive engagement with the other side of said collar.

4. An accessory tool for drill presses, lathes, milling machines and the like adapted to embrace and operatively engage a chuck, comprising a split collar hinged at one side thereof and including an expansive linkage connecting the opposite side thereof for locking said collar in closed position and opening said collar for removal of said tool from a chuck, a stud mounted in said collar for engaging the key pilot hole of said chuck, and a spring biased collar slidably mounted on said stud for engaging said chuck and forcing it into positive engagement with the other side of said collar.

5. An accessory tool for drill presses, lathes, milling machines and the like adapted to embrace and operatively engage a chuck, comprising a split collar hinged at one side thereof and including an expansive linkage connecting the opposite side thereof for locking said collar in closed position and opening said collar for removal of said tool from a chuck, and a stud, including a shoulder as an operative part thereof, threadedly mounted in said collar for engaging the key pilot hole of said chuck, and for adjustment to engage chucks of different sizes.

6. An accessory tool for drill presses, lathes, milling machines and the like adapted to embrace and operatively engage a chuck, comprising a collar for embracing said chuck and including a curved insert projecting therefrom of different curvature from that of said collar to fit a relatively small chuck, and a stud, including a shoulder as an operative part thereof, threadedly mounted in said collar opposite to said insert for engaging the key pilot hole of chucks of different sizes and for adjustment to positively engage chucks of different sizes with said insert.

7. An accessory tool for drill presses, lathes, milling machines and the like adapted to embrace and operatively engage a chuck, comprising a collar, a handle adjustably mounted in said collar, a stud mounted in said handle for engaging the key pilot hole of said chuck, and a spring biased collar slidably mounted on said stud for engaging said chuck and forcing it into positive engagement with said collar.

8. An accessory tool for drill presses, lathes, milling machines and the like adapted to embrace and operatively engage a chuck, comprising a collar, a stud mounted in said collar for engaging the key pilot hole of said chuck, and a spring biased collar mounted on said stud for engaging said chuck and forcing it into engagement with said collar.

9. An accessory tool for drill presses, lathes, milling machines and the like adapted to embrace and operatively engage a chuck, comprising a collar having a notch for receiving a chuck at one side thereof, a stud mounted in said collar for engaging the key pilot hole of said chuck, and a spring biased collar mounted on said stud for engaging said chuck and forcing it into engagement with the walls of the notch in said collar.

10. An accessory tool for drill presses, lathes, milling machines and the like adapted to embrace and operatively engage a chuck, comprising a collar, a handle threaded in said collar, a stud, including a shoulder as an operative part thereof, mounted in said handle for engaging the key pilot hole of said chuck, and for adjustment to engage chucks of different sizes, and a secondary collar mounted on said collar for receiving a tool.

11. An accessory tool for drill presses, lathes, milling machines and the like adapted to embrace and operatively engage a chuck, comprising a collar having a notch for receiving chucks of different sizes at one side thereof, a handle adjustably mounted in said collar, a stud mounted in said handle for engaging the key pilot hole of said chuck, and a spring biased collar mounted on said stud for engaging said chuck and forcing it into engagement with the walls of the notch in said collar.

12. An accessory tool for drill presses, lathes, milling machines and the like adapted to embrace and operatively engage a chuck, comprising a split wheel hinged at one side thereof and including an expensive linkage connecting the opposite side thereof, said linkage comprising a pair of toggle levers pivotally connected to one another and to said opposite sides for locking said wheel in closed position and opening said wheel, a split collar including portions mounted on the sides of said wheel, and a stud, including a shoulder as an operative part thereof, mounted in one portion of said collar for engaging the key pilot hole of said chuck, said stud being threaded in said collar for adjusting said stud to engage chucks of different sizes.

13. An accessory tool for drill presses, lathes, milling machines and the like adapted to embrace and operatively engage a chuck, comprising a wheel, a collar mounted concentrically of said wheel, a stud, including a shoulder as an operative part thereof, mounted in said collar, and means engaging said stud for moving it into engagement with the key pilot hole of said chuck.

14. An accessory tool for drill presses, lathes, milling machines and the like adapted to embrace and operatively engage a chuck, comprising a collar, a handle threaded in said collar, and a stud, including a shoulder as an operative part thereof, mounted in said handle for engaging the key pilot hole of said chuck.

References Cited in the file of this patent

UNITED STATES PATENTS

| Number | Name | Date |
|---|---|---|
| 1,226,101 | Marsden | May 15, 1917 |
| 1,261,092 | Allen | Apr. 2, 1918 |
| 1,331,366 | Pesa | Feb. 17, 1920 |
| 2,300,479 | Wilson | Nov. 3, 1942 |
| 2,304,038 | Thompson | Dec. 1, 1942 |